Figure 1:
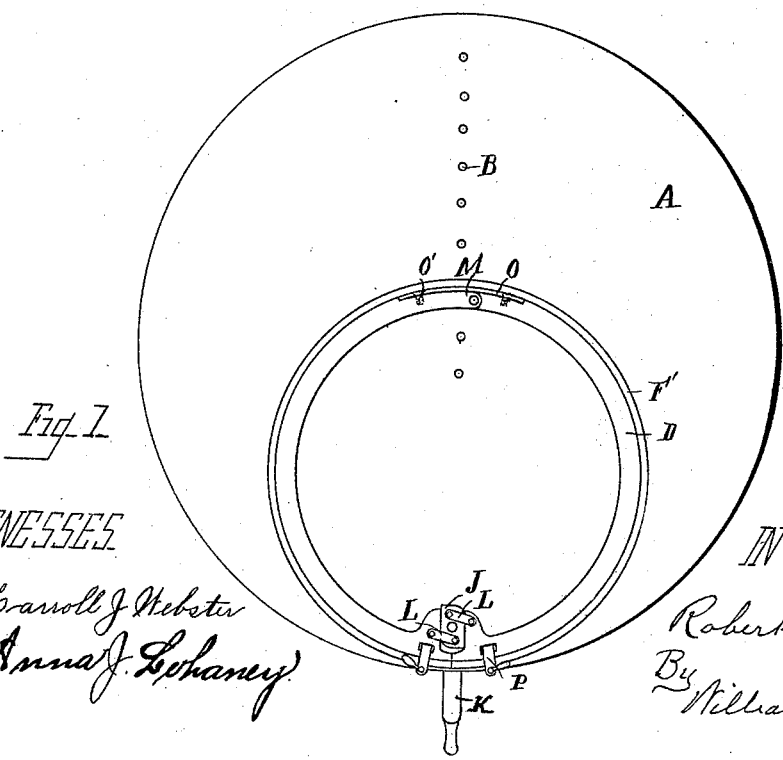

(No Model.)  2 Sheets—Sheet 1.

R. W. TAYLOR.
TIRE SIZING AND UPSETTING MACHINE.

No. 422,658. Patented Mar. 4, 1890.

WITNESSES
Carroll J. Webster
Anna J. Lehaney

INVENTOR
Robert W. Taylor
By William Webster
Atty (No Model.) 2 Sheets—Sheet 2.
R. W. TAYLOR.
TIRE SIZING AND UPSETTING MACHINE.
No. 422,658. Patented Mar. 4, 1890.
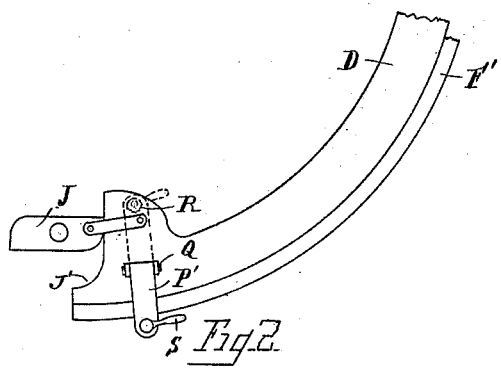
Fig. 2
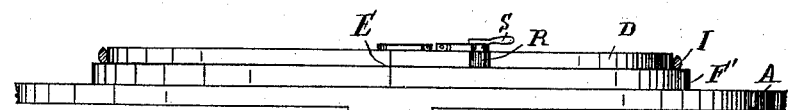
Fig. 3
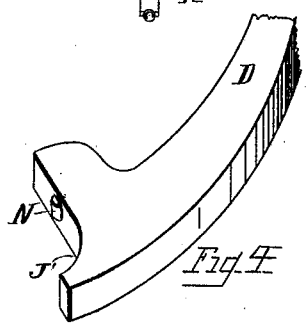
Fig. 5
Fig. 4
WITNESSES
Carroll J. Webster
Anna J. Delaney
INVENTOR
Robert W. Taylor
By William Webster
Atty

UNITED STATES PATENT OFFICE.

ROBERT W. TAYLOR, OF TOLEDO, OHIO, ASSIGNOR TO GEORGE W. HEARTLEY, OF SAME PLACE.

TIRE SIZING AND UPSETTING MACHINE.

SPECIFICATION forming part of Letters Patent No. 422,658, dated March 4, 1890.

Application filed June 17, 1889. Serial No. 314,650. (No model.)

*To all whom it may concern:*

Be it known that I, ROBERT W. TAYLOR, a citizen of the United States, residing at Toledo, in the county of Lucas and State of Ohio, have invented certain new and useful Improvements in a Tire Sizing and Upsetting Machine; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a tire sizing and upsetting machine, and has for its object to provide an apparatus whereby tires may be drawn to a uniform size by means of an expansible ring, or upset to a uniform size by the contraction of the ring.

A further object is to provide an expanding and upsetting machine of simple construction and easy operation.

The invention consists in providing a combined expanding and contracting ring formed of two semicircular sections and having a hinge uniting the said sections, and a combined expanding and contracting mechanism connected with the free ends of the ring-sections, said ring being so constructed that a tire placed over the same while in a state of ductility may be expanded or drawn or contracted to any desired diameter.

The invention consists, further, in the novel construction and combination of the various parts, as will be more fully hereinafter set forth.

In the drawings, Figure 1 is a plan view of my improved machine complete and showing the spring hinge-joint and combined expanding and contracting mechanism. Fig. 2 is an enlarged detail view of a portion of one of the semicircular sections, the cam-block, and clamp. Fig. 3 is a front view of the expanding ring and plate. Fig. 4 is a detail view of an end of a ring-section showing the antifriction roller against which the expanding mechanism moves. Fig. 5 shows a detail view of the hinge-joint detached.

In the branch of the art to which my invention relates it is necessary that the tires shall be of a uniform diameter, and as they leave the welding-machine in variable sizes it is essential that some rapid and inexpensive means be adopted to size the same to a uniformity by expanding those that are too small and contracting those of too great diameter. These results are effected by the mechanism hereinafter described, in which a ring formed of two semicircular sections connected with each other is caused to expand to enlarge the circle and draw the tire, or, by means of clamps that shall impinge the tire between the ring and clamps, shall when the ring is closed contract the tire to a determinate size.

A designates a metal plate, preferably circular, and perforated diametrically at B to receive a stud C, said stud passing through the rabbeted ends of the semicircular sections D′, which when properly joined make the circular ring D.

In constructing the expanding ring D, I may make the same of one diameter in cross-section, or it may be of two diameters, wherein the ring D surmounts a portion F′ of greater diameter, which acts as a rest and straightener for the tire I. In this construction the tire is laid upon the enlarged portion F′ of the ring, and when the tire has been brought to the desired diameter any irregularities in the horizontal condition of the tire are corrected by straightening the same in alignment with portion F′, by hammering or otherwise.

In order to expand the sizing-ring, I employ a cam-block J, pivotally interposed between the free ends of the ring-sections and operated by means of a lever K, rigidly secured thereto, the rotation of the cam, as shown in Fig. 2, opening the ring.

L L designate links pivotally connected with the inner and outer ends of the cam-block J and the inner and outer ends, respectively, of each free end of the ring-sections, the free ends of said sections being preferably cut away, as shown, in order to accommodate the cam-block, and at their opposite ends are rabbeted, and apertured to receive the hinge-stud C, the said sections being similar in shape, this allowing of two like sections being cast from one mold, and when reversed forming a hinge-joint for a complete circle.

N designates anti-friction rollers journaled in the free end of the ring-section to lessen the friction of the expanding device when urged between the same.

To assist in expanding the ring, a spring-plate O may be secured to the ring across the hinge by screws O', as shown in Fig. 1.

P designates clamps, comprising plates P', hinged to the end of each ring-section at Q in a suitable manner to allow the same to be thrown back out of the way when not in use, as shown in dotted lines, Fig. 2.

R designates an eccentrically-journaled serrated dog carried in the outer end of the plates P' and operated by means of a lever S, secured thereto.

When it is desired to reduce the diameter of the tire, the tire is placed over the ring (which is expanded) by turning the cam-block so that its major axis is brought in line with the circle of the ring, and the eccentric dogs R are caused to impinge upon the outer periphery of the tire and hold the same from movement upon the ring, which is now closed by reversing the position of the lever, thereby upsetting the same, the links L connected with the cam and ring tending to draw the ring closed.

It will be seen that the device is inexpensive of construction and easily managed.

I wish it to be understood that I do not claim a ring having a single transverse opening and an integral spring to close the same when the spreading device is withdrawn from contact with the ends thereof; but What I do claim is—

1. In a tire-sizer, a ring composed of two semicircular sections hinged together, in combination with a combined expanding and contracting device interposed between the free ends of the ring-sections and connected with a lever for operating the same, as and for the purpose set forth.

2. In combination with a diametrically-perforated plate, an expansible and contractible ring formed of two semicircular sections hinged together and secured to the plate by a projecting stud, and an interposed expanding and contracting mechanism for varying the diameter of the ring, as and for the purpose set forth.

3. In a tire-sizer, a diametrically-divided ring formed of two semicircular sections and provided with a hinge at one of the divisions, in combination with an interposed expander of increasing size and a lever for operating the same, as and for the purpose set forth.

4. In a tire-sizer, a ring formed of two sections, in combination with an expander interposed between the free ends of the sections and connected thereto by metal links, as and for the purpose set forth.

5. In a tire-sizer, a divided ring formed with anti-friction rollers in each side of the division, in combination with an expander adapted to move upon the rollers, as and for the purpose set forth.

6. In a tire-sizer, a divided ring having clamps hinged thereon, in combination with a lever mechanism for opening and closing the ring, as and for the purpose set forth.

In testimony that I claim the foregoing as my own I hereby affix my signature in presence of two witnesses.

ROBERT W. TAYLOR.

Witnesses:
GEORGE F. LINCOLN,
WILLIAM WEBSTER.